United States Patent [19]
Meese et al.

[11] Patent Number: 6,113,354
[45] Date of Patent: Sep. 5, 2000

[54] FUEL DELIVERY DEVICE

[75] Inventors: Klaus-Dieter Meese; Joachim Günther, both of Frankfurt, Germany

[73] Assignee: Mannesmann VDO AG, Germany

[21] Appl. No.: 09/188,619

[22] Filed: Nov. 9, 1998

[30] Foreign Application Priority Data

Nov. 12, 1997 [DE] Germany ............... 197 50 036

[51] Int. Cl.[7] .................................................. F04B 23/08
[52] U.S. Cl. .................................... 417/199.1; 417/199.2; 123/514
[58] Field of Search ..................... 123/495, 387, 123/514, 510, 509, 456; 137/143; 417/199, 199.1

[56] References Cited

U.S. PATENT DOCUMENTS

| | | | |
|---|---|---|---|
| 4,501,251 | 2/1985 | Kelch | 123/495 |
| 4,546,745 | 10/1985 | Brotherston | 123/387 |
| 5,218,942 | 6/1993 | Coba et al. | 123/514 |
| 5,289,810 | 3/1994 | Bauer et al. | 123/510 |
| 5,392,750 | 2/1995 | Laue et al. | 123/509 |
| 5,396,872 | 3/1995 | Ruger et al. | 123/514 |
| 5,692,479 | 12/1997 | Ford et al. | 123/514 |
| 5,732,684 | 3/1998 | Thompson | 123/514 |
| 5,743,239 | 4/1998 | Iwase | 123/514 |
| 5,749,345 | 5/1998 | Treml | 123/456 |
| 5,979,485 | 11/1999 | Tuckey et al. | 137/143 |
| 5,992,394 | 11/1999 | Mukaidani et al. | 123/509 |

FOREIGN PATENT DOCUMENTS

4111341C2  9/1993  Germany .

*Primary Examiner*—Teresa Walberg
*Assistant Examiner*—Leonid Fastovsky
*Attorney, Agent, or Firm*—David M. Thimmig; Mayer Brown & Platt

[57] ABSTRACT

In a fuel delivery device for a motor vehicle a delivery pump (15) is provided in addition to a fuel pump (14). The delivery pump (15) serves to fill a surge baffle (5) and to drive a sucking jet pump (6). The fuel pump (14) draws in fuel from the surge baffle (5) and delivers it to an internal combustion engine (2). For this purpose, the fuel pump (14) is arranged in a feed line (3) in the vicinity of the internal combustion engine (2). A return line (4) leads from the internal combustion engine into the surge baffle (5).

11 Claims, 1 Drawing Sheet

FUEL DELIVERY DEVICE

BACKGROUND OF THE INVENTION

The invention relates to a fuel delivery device for a motor vehicle, having a fuel tank, which has a surge baffle, and a fuel pump for delivering fuel from the surge baffle to a motor vehicle internal combustion engine via a feed line, and having a sucking jet pump arranged in the fuel tank.

Fuel delivery devices of this type are frequently used in today's motor vehicles which have diesel engines or spark ignition engines as the internal combustion engine, and are thus known. In these devices the fuel pump delivers fuel from the surge baffle into the feed line and to the sucking jet pump. The sucking jet pump serves to deliver fuel into the surge baffle from a region of the fuel tank which is remote from the surge baffle and is generally separated from the region with the surge baffle by a saddle. However, the connection of the sucking jet pump to the surge baffle is very complicated to install. Furthermore, the surge baffle has to be arranged at a very low point within the fuel tank and has to be open at the top so that fuel gets into it from above when the fuel tank is empty or nearly empty. In the case of diesel fuel, in particular, this leads to pronounced foam formation which becomes ever more intensive the hotter the fuel is. In addition, when the tank is nearly empty, air is drawn in by the sucking jet pump and this likewise leads to a pronounced formation of foam. This foam is then drawn in by the fuel pump and leads to the fuel delivery being interrupted. Particularly pronounced formation of foam occurs in modern diesel engines since in these the fuel flowing back into the fuel tank via the return line is at a very high temperature.

SUMMARY OF THE INVENTION

The invention is based on the problem of designing a fuel delivery device in such a manner that formation of foam in the surge baffle is largely avoided even at high fuel temperatures.

According to the invention, this problem is solved by a delivery pump for delivering fuel directly from the fuel tank into the surge baffle and to the sucking jet pump, and by the fact that the sucking jet pump is arranged to deliver fuel from a region of the fuel tank which is separated from the region with the surge baffle, into the region with the surge baffle.

This design enables the fuel delivery device to have a delivery pump which is independent of the fuel pump. This delivery pump ensures that the surge baffle is continuously filled. Fuel should not therefore slosh into the surge baffle from above, which leads to a pronounced reduction in the formation of foam in the surge baffle. The delivery pump according to the invention makes it possible for the surge baffle to be arranged at any desired point in the fuel tank, for example on a sealing cover. Since the delivery pump drives the sucking jet pump, the latter receives, as working fluid, relatively cool fuel from the fuel tank and not the hot fuel flowing back from the internal combustion engine. Since the sucking jet pump delivers fuel into that region of the fuel tank which has the surge baffle, foam is not directly delivered into the surge baffle by the sucking jet pump. The fuel pump is therefore also unable to draw in any foam from the surge baffle.

The surge baffle is always reliably filled under all operating conditions if, in accordance with an advantageous development of the invention, the amount of fuel delivered by the delivery pump to the sucking jet pump is approximately the same as the amount delivered into the surge baffle.

The fuel delivery device according to the invention is designed in a particularly space-saving manner if the delivery pump is arranged in the surge baffle and the fuel pump is arranged in the vicinity of the internal combustion engine. This design furthermore means that the feed line is not under pressure, which reduces the complexity of sealing it.

In accordance with another advantageous development of the invention, the risk of formation of foam in the surge baffle is further reduced if the delivery pump, to fill the surge baffle, has a filling line which is immersed in the surge baffle and leads almost to its bottom. This means that when fuel flows into the surge baffle, air, which would lead to pronounced formation of foam, is not entrained.

In accordance with another advantageous development of the invention, the fuel passes into the surge baffle in a particularly steady manner if the filling line is surrounded by a stabilizing space which extends from the bottom into the upper region of the surge baffle. This design makes it possible for any air bubbles present in the fuel to be separated from the fuel in this stabilizing space. As a result, the fuel present in the surge baffle does not foam up even when the motor vehicle is cornering, during which the delivery pump could briefly deliver air or foam.

In the case of a fuel delivery device having a return line leading from the internal combustion engine back into the fuel tank, the return line can be led directly into the fuel tank. Since the fuel conducted in the return line is basically at a higher temperature than the fuel present in the fuel tank, unnecessary heating up of the fuel tank is prevented in a simple manner in that the return line opens into the surge baffle.

The fuel delivered via the return line into the surge baffle is stabilized in a simple manner in that the return line is guided to a point directly above the bottom of the surge baffle, and is surrounded by a stabilizing space which extends from the bottom into the upper region of the surge baffle.

According to another advantageous development of the invention, the formation of foam in the fuel tank by air being entrained by the fuel flowing out of the surge baffle is reduced in that the surge baffle has an overflow pipe which penetrates through the bottom of the surge baffle and is guided up to an intended filling height.

In accordance with an advantageous development of the invention, the venting of the surge baffle is designed in a particularly simple manner if the surge baffle has, on its upper side, a vent having a filter inserted therein. The filter prevents dirt from penetrating into the surge baffle. Furthermore, foam produced, for example, by vibration passes out of the surge baffle through the filter.

In accordance with an advantageous development of the invention, noises produced by the delivery pump are not transmitted to the fuel tank if the delivery pump is held in the surge baffle by an elastomeric part.

Failure of the delivery pump to deliver fuel is synonymous with an empty fuel tank. In accordance with an advantageous development of the invention, damage to the delivery pump due to dry running can be avoided in a simple manner if means are provided to shut off the internal combustion engine in the event of the delivery pump failing to deliver fuel. These means, moreover, have the advantage that fuel remains in the surge baffle when the fuel tank is empty. When the fuel tank is filled up again, this measure prevents air from passing into the feed line and interrupting the fuel supply. Dry running of the delivery pump can be detected, for example, by the reduction in its power consumption.

BRIEF DESCRIPTION OF THE DRAWINGS

The invention permits numerous embodiments. To further clarify its basic principle, one of these embodiments is represented in the drawing and described below. In the drawing

DETAILED DESCRIPTION OF THE PREFERRED EMBODIMENT

Figure 1:
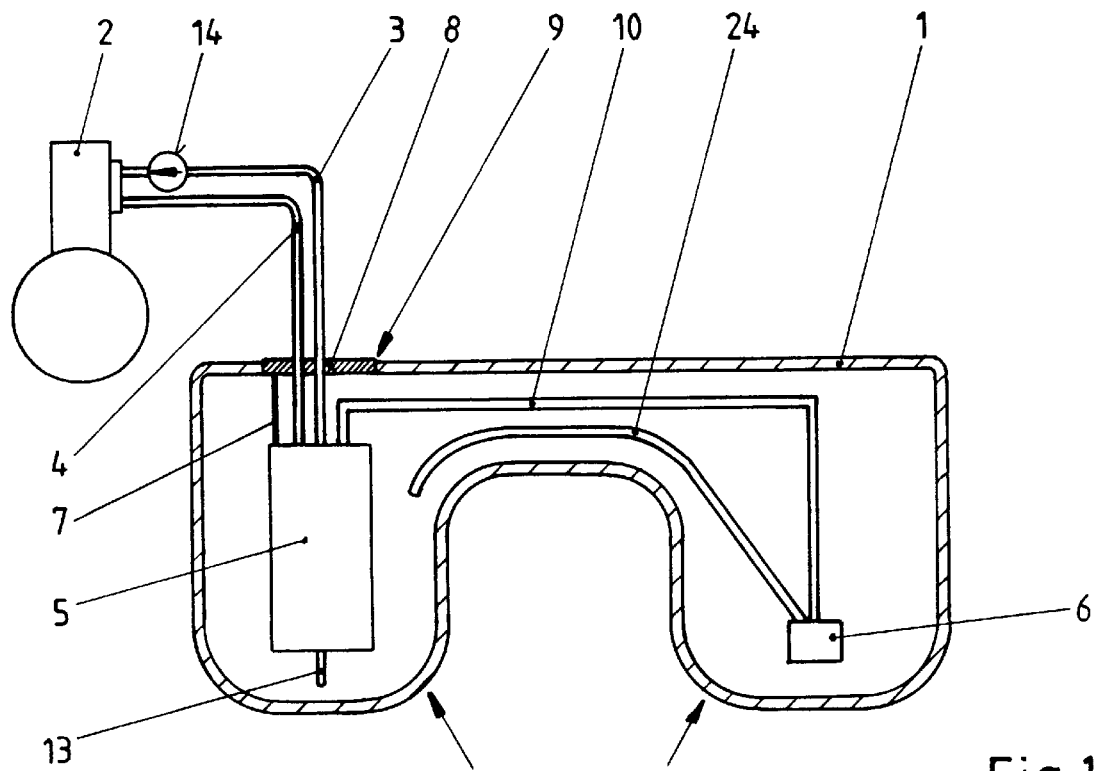
FIG. 1 shows a sectional representation through a fuel tank with a fuel delivery device according to the invention.

FIG. 1 shows a fuel tank 1 and an internal combustion engine 2 which are connected to one another via a feed line 3 and a return line 4. A surge baffle 5 and a sucking jet pump 6 are arranged in the fuel tank 1. The surge baffle 5 is fastened by a retaining arm 7 to a sealing cover 8 which is inserted into an opening 9 in the fuel tank 1.

The sucking jet pump 6 is supplied with fuel via a delivery line 10 and, via a line 24, delivers this fuel from a region 11 of the fuel tank 1 into the region 12 in which the surge baffle 5 is arranged. The fuel is drawn into a delivery pump 15 directly from the bottom region of the fuel tank 1 via an intake line 13. A fuel pump 14 is arranged in the feed line 3 in the vicinity of the internal combustion engine 2.

Figure 2:
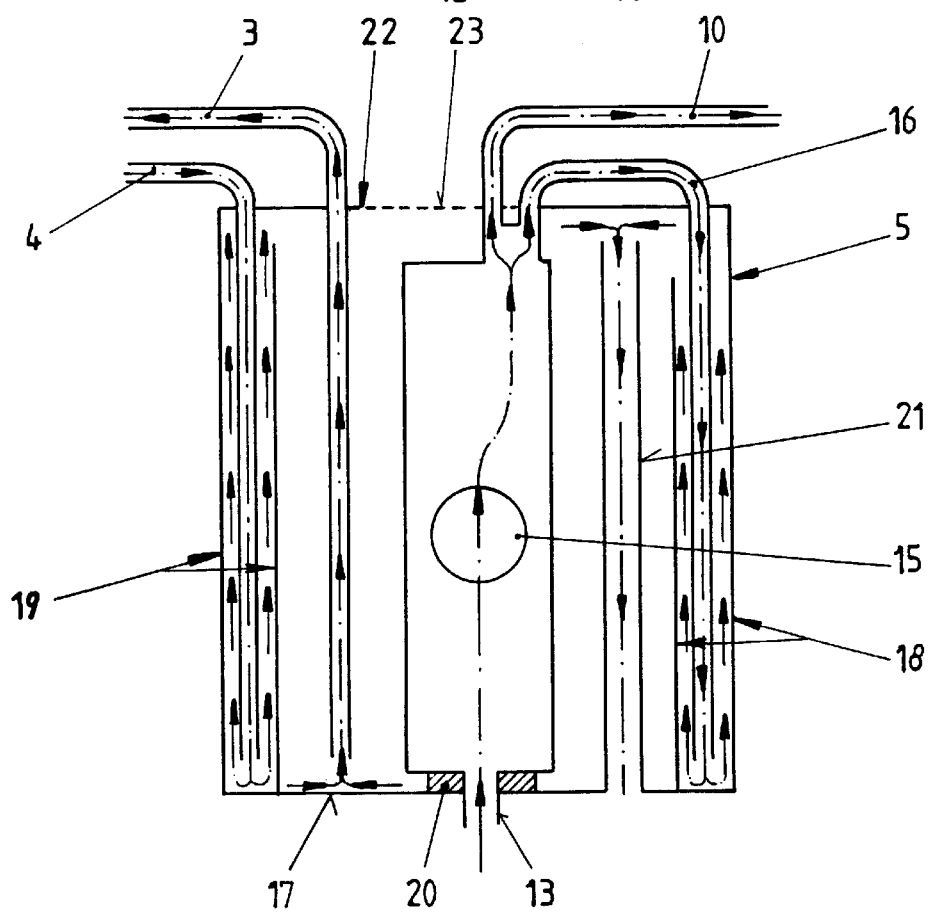
FIG. 2 shows a sectional representation of a surge baffle from FIG. 1.

FIG. 2 shows the surge baffle 5 from FIG. 1 in a sectional representation. A delivery pump 15 is arranged in the surge baffle 5, which delivery pump delivers fuel from the intake line 13 into a filling line 16 and into the delivery line 10 leading to the sucking jet pump 6. The flow directions of the fuel are marked in the drawing by arrows. The filling line 16 and the return line 4 are guided to a point directly above the bottom 17 of the surge baffle 5 and are in each case surrounded by stabilizing spaces 18, 19 which extend from the bottom 17 into the upper region of the surge baffle 5. As a result, the fuel passes degassed and in a particularly steady manner into the surge baffle 5. The feed line 3 is likewise guided to a point directly above the bottom 17 of the surge baffle 5 and draws fuel off here. The delivery pump 15 is held by an elastomeric part 20 to avoid noises being transmitted. As an overflow, use is made of an overflow pipe 21 which penetrates through the bottom 17 of the surge baffle 5 and extends up to the intended filling height. On the upper side, the surge baffle 5 has a vent 22 with a filter 23 inserted therein. To protect the fuel pump 14 and delivery pump 15 from dry running, the motor vehicle fuel delivery device can be provided with a simple electrical control (not shown) to shut off the internal combustion engine 2 when the fuel tank 1 is empty. The control could, for example, shut off the internal combustion engine 2 when it senses a reduction in the power consumption of the delivery pump 15. This would ensure that the fuel pump 14, feed line 3 and surge baffle 5 contain fuel despite the fuel tank 1 being empty.

We claim:

1. A fuel delivery device for a motor vehicle, having a fuel tank (1), which has a surge baffle (5), and a fuel pump (14) for delivering fuel from the surge baffle (5) to a motor vehicle internal combustion engine (2) via a feed line (3), and having a sucking jet pump (6) arranged in the fuel tank (1), said device further comprising a delivery pump (15) for delivering fuel directly from the fuel tank (1) into the surge baffle (5) and to the sucking jet pump (6), and wherein the sucking jet pump (6) is arranged to deliver fuel from a region of the fuel tank (1) which is separated from the region with the surge baffle (5), into the region with the surge baffle (5).

2. The fuel delivery device as claimed in claim 1, wherein the amount of fuel delivered by the delivery pump (15) to the sucking jet pump (6) is approximately the same as the amount delivered into the surge baffle (5).

3. The fuel delivery device as claimed in claim 1, wherein the delivery pump (15) is arranged in the surge baffle (5) and the fuel pump (14) is arranged in the vicinity of the internal combustion engine (2).

4. The fuel delivery device as claimed in claim 1, wherein the surge baffle (5) has a bottom (17), and the delivery pump (15) has a filling line (16) which is immersed in the surge baffle (5) and leads almost to its bottom (17).

5. The fuel delivery device as claimed in claim 4, wherein the filling line (16) is guided to a point directly above the bottom (17) of the surge baffle (5), and is surrounded by a space (18) which extends from the bottom (17) into the upper region of the surge baffle (5).

6. The fuel delivery device as claimed in claim 1, further comprising a return line (4) leading from the internal combustion engine (2) back into the fuel tank (1), wherein the return line (4) opens into the surge baffle (5).

7. The fuel delivery device as claimed in claim 6, wherein the surge baffle (5) has a bottom (17) and the return line (4) is guided to a point directly above the bottom (17) of the surge baffle (5), and is surrounded by a space (19) which extends from the bottom (17) into the upper region of the surge baffle (5).

8. The fuel delivery device as claimed in claim 1, wherein the surge baffle (5) has a bottom (17) and an overflow pipe (21) which penetrates through the bottom (17) of the surge baffle (5) and is guided up to an intended filling height.

9. The fuel delivery device as claimed in claim 1, wherein the surge baffle (5) has, on its upper side, a vent (22) having a filter (23) inserted therein.

10. The fuel delivery device as claimed in claim 1, wherein the delivery pump (15) is held in the surge baffle (5) by an elastomeric part (20).

11. The fuel delivery device as claimed in claim 1, wherein means are provided to shut off the internal combustion engine (2) in the event of the delivery pump (15) failing to deliver fuel.

* * * * *